United States Patent Office 2,763,665
Patented Sept. 18, 1956

2,763,665
PROCESS FOR THE MANUFACTURE OF LEVULINIC ACID ESTERS

Ritchie Hart Lock, Ilford, and Kenneth Reynolds, Dagenham, England, assignors, by mesne assignments, to Howards of Ilford Limited, Ilford, England, a British company No Drawing. Application July 28, 1952,
Serial No. 301,368

Claims priority, application Great Britain July 31, 1951

10 Claims. (Cl. 260—347.4)

It is known that the methyl or ethyl ester of levulinic acid ($\beta$-acetylpropionic acid) can be made by boiling a mixture of furfuryl alcohol and methyl or ethyl alcohol under reflux in the presence of hydrogen chloride as a catalyst. The reaction involves the additive combination of equimolecular proportions of furfuryl alcohol and the other alcohol accompanied by the opening of the furane ring and intramolecular rearrangement, the nature of which is not fully understood. The yields of the esters obtained in this manner have not been high, the highest yield said to have been obtained is 65 per cent of the theoretical yield in the case of the ethyl ester (see A. E. Tchitchibabine, "Chimie et Industrie," Special No. March 1932, vol. 27, No. 3, pages 563–568).

The present invention provides a process for the manufacture of levulinic acid esters, which comprises heating furfuryl alcohol at a temperature within the range of 64° C. to 220° C. with a different alcohol selected from the group consisting of unsubstituted primary and secondary carbon chain and oxygen-carbon chain aliphatic and carbon ring and oxygen-carbon ring cycloaliphatic alcohols containing from 1 to 10 carbon atoms under substantially anhydrous conditions with agitation in the presence of a catalyst selected from the group consisting of hydrogen chloride and hydrogen bromide, and gradually adding the furfuryl alcohol to the other alcohol at a rate such that at no time does the amount of unreacted furfuryl alcohol present exceed 2 per cent by volume of the other alcohol, and using more than 4 molecular proportions of the said other alcohol per molecular proportion of the furfuryl alcohol used.

The invention is based on the unexpected observation that, by the above described procedure of gradually adding the furfuryl alcohol to the other alcohol, the yield of the levuline acid ester calculated on the furfuryl alcohol used is substantially greater than that obtained when the whole of the furfuryl alcohol is present from the outset under otherwise similar reaction conditions.

The larger the excess of the other alcohol over unreacted furfuryl alcohol during the reaction, the greater is the yield of the ester obtained calculated on the furfuryl alcohol used. For this purpose it is of advantage that the rate of addition of the furfuryl alcohol should be such that at no time is the amount of unreacted furfuryl alcohol present in the reaction mixture greater than 2 per cent, and preferably 0.5 to 1 percent by volume of the other alcohol.

It will be understood that towards the end of the addition of the furfuryl alcohol and after the addition is complete, the concentration of the other alcohol must be sufficient to maintain an adequate rate of reaction. For this purpose a total of more than 4 molecular proportions of the other alcohol for each molecular proportion of furfuryl alcohol is used.

As the primary or secondary alcohol to be reacted with furfuryl alcohol there may be an aliphatic alcohol, for example, methanol, ethanol, n-propanol, isopropanol, n-butanol, isobutanol, n-pentanol, isopentanol, n-hexanol, n-octanol, n-nonyl alcohol or n-decanol; an alkoxy-ethanol, for example, $\beta$-methoxy-ethanol or $\beta$-ethoxy-ethanol; or a cycloaliphatic alcohol, for example, cyclohexanol or tetrahydrofurfuryl alcohol.

The attainment of a high yield is also favoured by working at a temperature not less than about 90° C. The reaction is advantageously carried out by adding the furfuryl alcohol to the other alcohol while the latter is maintained at the boil. It is generally most convenient to maintain the alcohol at the boil under atmospheric pressure, although a lower or higher pressure may be used, if desired.

The hydrogen chloride of hydrogen bromide used as catalyst is present in the alcohol to which the furfuryl alcohol is added and advantageously the concentration of the hydrogen halide in the former alcohol ranges from 0.4–0.6 parts by weight per 100 parts by volume of the alcohol.

The process of the invention may also be carried out in a continuous manner by continuously withdrawing a part of the reaction mixture during the reaction and the addition of furfuryl alcohol, and adding fresh amounts of the other alcohol and hydrogen chloride or hydrogen bromide to replace the loss of these constituents caused by the reaction mixture withdrawn. In this manner the concentration of the other alcohol in the reaction mixture and the excess of that alcohol over unreacted furfuryl alcohol can be maintained substantially constant at favourable values so as to ensure the maintenaince of a high yield throughout a continuous run of the process.

The esters of levulinic acid obtained by the process of the invention are useful for various purposes, for example, as plasticisers or solvents, or as intermediate products for the manufacture of the free acids by hydrolysis with water or of salts of the acid by hydrolysing the esters with metal compounds of alkaline reaction. Calcium levulinate, for example, is of special importance in calcium therapy or dietetics.

The following examples illustrate the invention:

Example 1

196 grams of freshly distilled furfuryl alcohol (containing less than 0.5 per cent of water) were introduced continously at a uniform rate in the course of ½ hour into 1 litre of methanol containing 0.6 gram of hydrogen chloride per 100 cc. of methanol, the methanol being maintained at the boil under reflux at atmospheric pressure, while stirring vigorously, throughout the addition of the furfuryl alcohol. When the addition was complete, the mixture was refluxed, while stirring, for a further ½ hour. The excess of methanol was then distilled from the mixture, and then the methyl levulinate was distilled. The quantity of the ester so distilled amounts to 136 grams, which represents 52 per cent of the theoretical yield.

Example 2

The procedure was identical with that described in Example 1, except that ethanol was used instead of methanol. 194 grams of ethyl levulinate, representing a yield of 67 per cent. of the theoretical yield.

Example 3

The procedure was identical with that described in Example 1, except that, instead of methanol, there was used n-butanol (conforming to British Standard Specification No. 508) which had been freshly distilled over a boiling range of 2° centigrade at atmospheric pressure. The excess of n-butanol was distilled from the mixture under a pressure of 5 mm. of mercury at about 35° C., and then the n-butyl levulinate was distilled under the same pressure. The quantity of the ester so distilled amounted to 334 grams, representing 97 per cent. of the theoretical yield.

By working at a temperature of 110–112° C., instead of boiling the n-butanol, a yield of 93 per cent. of the ester was obtained.

Example 4

The procedure was identical with that described in Example 3, except that isobutanol was used, instead of n-butanol, and, after the addition of the furfuryl alcohol, the mixture was refluxed for one hour longer, instead of ½ hour. The greater part of the isobutanol was then removed by distillation under 5 mm. pressure of mercury. The crude isobutyl levulinate was recovered by fractional distillation under 2 mm. pressure of mercury, yielding 275 grams of the ester boiling at 230° C. (under atmospheric pressure) and representing 80 per cent. of the theoretical yield.

Example 5

98 grams of freshly distilled furfuryl alcohol (containing less than 0.5 per cent. of water) were introduced continuously at a uniform rate in the course of ½ hour into 1140 cc. of n-decanol containing 0.6 gram of hydrogen chloride per 100 cc. of n-decanol, the mixture being maintained at 115–118° C., while vigorously stirring, throughout the addition of the furfuryl alcohol. Thus, the n-decanol was not boiling. When the addition was complete, the mixture was heated at the same temperature, while stirring, for a further ½ hour. By distillation under reduced pressure, the excess of n-decanol was first removed and then the n-decyl levulinate, which on fractionation gave 225 grams of the ester, representing 88 per cent. of the theoretical yield.

Example 6

The procedure was identical with that described in Example 1, except that cyclohexanol was used instead of methanol. The cyclohexyl levulinate so obtained was fractionated under 2 mm. pressure of mercury to give 333 grams of the ester, representing a yield of 84 per cent. of the theoretical yield.

Example 7

The procedure was identical with that described in Example 1, except that β-methoxyethanol was used instead of methanol. After the removal of the excess of methoxyethyl alcohol by distillation under reduced pressure, the β-methoxyethyl levulinate so obtained was fractionated under reduced pressure to give 330 grams of the ester, representing 95 per cent. of the theoretical yield.

By using β-ethoxy-ethanol, instead of β-methoxyethanol there was obtained in a similar manner a yield of 90% of the theoretical yield of β-ethoxyethyl levulinate.

Example 8

The procedure was identical with that described in Example 1, except that tetrahydrofurfuryl alcohol was used instead of methanol. The resulting tetrahydrofurfuryl levulinate was fractionated under reduced pressure to give 325 grams of the ester, representing 87 per cent. of the theoretical yield.

Example 9

The procedure was identical with that described in the first paragraph of Example 3, except that the n-butanol contained 1.3 grams of hydrogen bromide per 100 cc. of n-butanol, instead of 0.6 gram of hydrogen chloride per 100 cc. The yield of n-butyl levulinate amounted to 83 per cent. of the theoretical yield.

By working in a manner analogous to that described in Example 1, that is to say, with the alcohol at the boil, with n-propanol, isopropanol, n-pentanol, isopentanol, n-hexanol, n-octanol and n-nonyl alcohol, the following yields of the corresponding esters were obtained:

| | Per cent |
|---|---|
| n-Propyl levulinate | 89 |
| Isopropyl | 57 |
| n-Amyl | 94 |
| Isoamyl | 77 |
| n-Hexyl | 89 |
| n-Octyl | 95 |
| n-Nonyl | 66 |

Example 10

This example illustrates the continuous method for carrying out the process of the invention.

To 250 cc. of freshly distilled n-butanol (as used in Example 3) containing 0.6 gram of hydrogen chloride per 100 cc. of butanol, maintained at the boil under reflux, while slowly stirring, were added the same n-butanol containing hydrogen chloride at a uniform rate of 13 cc. per minute and freshly distilled furfuryl alcohol (as used in Example 1) at a uniform rate of 1.027 cc. per minute. The reaction mixture was withdrawn at the same rate as the n-butanol and furfuryl alcohol were added, that is to say, at 14.027 cc. per minute. After 75 minutes the concentration of n-butyl levulinate in the mixture withdrawn became constant, the mixture withdrawn was collected for the next 70 minutes. 132 grams of n-butyl levulinate, representing 95 per cent. of the theoretical yield, were isolated by distillation from the collected mixture.

We claim:

1. A process for the manufacture of levulinic acid esters, which comprises heating furfuryl alcohol at a temperature within the range of 64° C. to 220° C. with a different alcohol selected from the group consisting of unsubstituted primary and secondary carbon chain and oxygen-carbon chain aliphatic and carbon ring and oxygen-carbon ring cycloaliphatic alcohols containing from 1 to 10 carbon atoms under substantially anhydrous conditions with agitation in the presence of a catalyst selected from the group consisting of hydrogen chloride and hydrogen bromide, and gradually adding the furfuryl alcohol to the other alcohol at a rate such that at no time does the amount of unreacted furfuryl alcohol present exceed 2 per cent by volume of the other alcohol, and using more than 4 molecular proportions of the said other alcohol per molecular proportion of the furfuryl alcohol used.

2. A process as claimed in claim 1, wherein the amount of unreacted furfuryl alcohol present in the mixture at no time exceeds 1 per cent by volume of the other alcohol.

3. A process as claimed in claim 1, wherein the amount of unreacted furfuryl alcohol present in the mixture at no time exceeds 0.5 per cent by volume of the other alcohol.

4. A process as claimed in claim 1, wherein the temperature is within the range of 90° C. to 220° C.

5. A process as claimed in claim 1, wherein the said other alcohol is maintained at the boil during the addition of the furfuryl alcohol.

6. A process as claimed in claim 1, wherein the said other alcohol is selected from the group consisting of a primary and secondary carbon chain aliphatic alcohol containing not more than 10 carbon atoms.

7. A process as claimed in claim 1, wherein the said other alcohol is an alkoxy-ethanol.

8. A process as claimed in claim 7, wherein the alkoxyethanol is selected from the group consisting of β-methoxyethanol and β-ethoxy-ethanol.

9. A process as claimed in claim 1, wherein the said other alcohol is selected from the group consisting of cyclohexanol and tetrahydrofurfuryl alcohol.

10. A process as claimed in claim 1, wherein the process is carried out in a continuous manner by continuously withdrawing a part of the reaction mixture during the reaction and the addition of furfuryl alcohol, and adding fresh amounts of the said other alcohol and catalyst to replace the loss of these constituents caused by the reaction mixture withdrawn.

References Cited in the file of this patent

A. E. Tchitchibabine: Chimie et Industrie, Special No. March 1932, vol. 27, No. 3, pp. 563–568.

Pummerer et al.: Ber. 68, 480 (1935).

Industrial & Eng. Chem., vol. 34, No. 7, p. 814, July 1942.